United States Patent Office 3,380,893
Patented Apr. 30, 1968

3,380,893
METHOD OF INTRODUCING A COLORED GROUP SENSITIVE TO pH CHANGES INTO ENZYMES BY REACTING WITH 2-METHOXY-5-NITRO-BENZYL BROMIDE
Daniel E. Koshland, Jr., Bellport, and Harry George Latham, East Patchogue, N.Y., and Horace Robert Horton, Raleigh, N.C., assignors to the United States of America as represented by the United States Atomic Energy Commission
No Drawing. Filed Aug. 23, 1965, Ser. No. 481,991
1 Claim. (Cl. 195—68)

ABSTRACT OF THE DISCLOSURE

A method of introducing a color sensitive group into enzymes for enzymatic studies comprising reacting an enzyme having at least one methionyl, sulfhydryl and tryptophanyl group with 2-methoxy-5-nitrobenzyl-bromide to introduce the sensitive group into the enzyme.

---

This invention relates to a novel composition of matter and method of using same.

In a copending application S.N. 350,924, filed Mar. 10, 1964 now abandoned a novel composition of matter, 2-hydroxy-5-nitrobenzyl-bromide was disclosed and shown to be useful in the examination of certain properties of enzymes. 2-hydroxy-5-nitrobenzyl-bromide is highly sensitive for tryptophan at neutral and acidic pH values. It has some reactivity towards cysteine but failed to produce any methionine derivatives and reacts rapidly with water (half time of hydrolysis <1 minute). Thus its use as a tracer has definite limitations.

It is an object of this invention to provide those skilled in the art with a new and useful composition of matter.

It is a further object of this invention to provide those skilled in the art with a method of introducing environmentally sensitive color groups relatively insensitive to pH changes into enzymes which can be employed in an aqueous media.

Other objects of this invention will in part be obvious and will in part appear hereinafter.

We have discovered 2-methoxy-5-nitrobenzyl bromide, a new composition of matter.

We have further discovered a method of introducing a colored group sensitive to environmental changes into enzymes comprising reacting 2-methoxy-5-nitrobenzyl bromide composition of this invention with at least one enzyme containing at least one member of the group consisting of sulfhydryl, methionyl and tryptophanyl groups. Such a reaction will introduce a colored group into the enzyme which will be subject to environmental changes such as changes in the solvent environment, changes in the conformation of the enzyme and changes caused by the approach of substrates to the enzyme, e.g., a change from an aqueous to a hydrocarbon environment has been demonstrated to cause a color change in the protein reagent.

The chromophoric grouping of 2-methoxy-5-nitrobenzyl bromide absorbs in the 288 to 320 m$\mu$ region with a spectrum and extinction coefficient resembling that of the unionized form of the 2-hydroxyl derivative. Unlike the 2-hydroxyl-5-nitrobenzyl bromide, the methoxy derivative does not exhibit spectral changes accompanying variations in pH (from pH<3 to pH>10). The spectrum is sensitive, however, to other environmental changes, notably solvent polarity.

Lack of pH sensitivity, particularly in view of the large effect of environmental polarity on the chromophore's spectrum, affords an attractive feature in the potential usefulness of this reagent for protein studies. In such applications, the 2-methoxy-5-nitrobenzyl grouping provides sensitive spectral responses to conformational changes involving the partial reorientation of the chromophore-labeled amino acid residue from a nonpolar "buried" region to a more polar or hydrophilic environment (or vice versa). In those special cases in which an amino acid residue in the immediate vicinity of the active site of an enzyme becomes labeled by this reagent, spectral changes resulting from direct interaction with substrate may provide valuable information concerning structure-activity relationships.

In polar solvents the 2-methoxy-5-nitrobenzyl grouping shows an absorption maximum in the region of 315 m$\mu$ and a molar extinction coefficient quite comparable to that of the unionized form of the 2-hydroxy-5-nitrobenzyl chromophore (9200, acidic solutions). The potential sensitivity of difference spectra of proteins labeled with this reagent is enhanced over unlabeled proteins due to the marked increase in molar absorptivity at 324 m$\mu$ (9200 $M^{-1}cm.^{-1}$) of the 2-methoxy chromophore that results from changing from a hydrophobic to a hydrophilic environment. This difference in molar absorptivity appears to be over ten times the differences attributable to tryptophan in proteins or to such model compounds as indole. Moreover, this increase occurs in a region of the spectrum in which little absorption is produced by the amino acid residues themselves. The absorption maximum of indole in water occurs at a wavelength only 1 m$\mu$ shorter than indole in a hydrocarbon solvent, whereas the absorption maximum of 2-methoxy-5-nitrobenzyl bromide in aqueous dioxane is displaced by 27 m$\mu$ towards longer wavelengths as compared to the compound in hexane.

The reactivity of 2-methoxy-5-nitrobenzyl bromide with amino acids strongly resembles that of unsubstituted benzyl bromide. As a protein modification reagent, the 2-methoxy derivative does not react as rapidly as does 2-hydroxy-5-nitrobenzyl bromide, nor does it exhibit its specificity for tryptophanyl residues. Hydrolysis of the methoxy derivative is likewise far slower than that of the hydroxy reagent.

The following example is given to illustrate our invention:

Ten grams of p-nitroanisole, 130 milliliters of 47–49% hydrobromic acid, one milliliter of sulfuric acid (concentrated) and 17.5 milliliters of methylal were placed in a three necked flask with a condenser, thermometer and an inlet tube for bubbling hydrogen bromide gas through the reaction mixture. The reaction mixture was stirred with a magnetic stirrer, and heated with a glass collar heating mantle maintaining a temperature of 70±2° C. for four hours. The reaction flask was then cooled in ice, and the solid contents collected on a sintered glass funnel. After air drying overnight the solid material was recrystallized twice from 150 milliliters of a warm benzene-petroleum ether solution, with filtering while warm to remove any benzene-petroleum ether insoluble substances, cooling in an ice-bath, collecting and drying in air to give about 5 grams of crystals, which appeared to be white needles having a M.P. 78–79° C., in 36% yield. Elemental analysis of the product showed C, 38.74 percent; H, 3.00 percent; Br, 32.63 percent. The calculated analysis for $C_8H_8BrNO_3$ is C 39.05 percent; H, 3.28 percent; Br, 32.48 percent.

Solution: $5 \times 10^{-5}$ M in 2-methoxy-5-nitrobenzyl bromide in n-hexane and in 50% dioxane, 50% water were pipetted into one compartment of a match pair of double-sector quartz cells, and the alternate solvent (50% dioxane, 50% water or n-hexane) into the other compartment of each cell, respectively. The difference spectra of these samples and a series of controls were recorded using a Cary Model 14 spectrophotometer. The spectral difference between the chromophore in 50% aqueous medium and in hydrocarbon environment ($A_{polar} - A_{nonpolar}$) exhibits a maximum at 324 m$\mu$, and a minimum at 280 m$\mu$. Accompanying this spectral shift is an *increase* in the molar absorptivity of the chromophore at 324 m$\mu$ of 9200 M$^{-1}$cm.$^{-1}$.

Reactivity with amino acids.—Aqueous solutions of amino acids common to proteins (i.e., amino acid "calibration standards" plus L-tryptophan) at a concentration of 0.0001 M were treated with 0.01 M 2-methoxy-5-nitrobenzyl bromide reagent (0.2 M solution in dried acetone) at pH values ranging from 3.0 to 8.7, and a final acetone concentration of 5%. Reaction was allowed to proceed at room temperature in the dark with continuous mixing, under an atmosphere of nitrogen. After appropriate intervals, aliquots were removed, extracted with ether at 0° to remove excess reagent, adjusted to pH 2.2, and analyzed.

Recovery data revealed that tryptophan, methionine and probably cysteine are modified by treatment with 2-methoxy-5-nitrobenzyl bromide. The rate of reaction with methionine and tryptophan was essentially independent of the pH of the reaction mixture over the range studied. Under the conditions employed, approximately 74% of the tryptophan and 61% of the methionine became modified in 89 hours' incubation. In each sample studied, the ratio of tryptophan reacted to methionine reacted was 1.2. The reagent reacts with cysteine also, but precise rates are more difficult to assess because of the ease of reoxidation of cysteine to cystine. None of the other amino acids were modified by treatment under these conditions.

Finally, it should be mentioned that the methoxyl compound has a specificity of reaction which, though similar, is significantly different from the 2-hydroxyl compound. The methoxy reagent reacts with methionine as well as with tryptophan and cysteine. As such it is useful in conjunction with the 2-hydroxy-5-nitrobenzyl bromide in protein modification studies.

Having described our invention what we desire to secure by Letters Patent is:

1. A method of introducing a colored group sensitive to environmental changes into enzymes comprising reacting 2-methoxy-5-nitrobenzyl-bromide with at least one enzyme containing at least one member of the group consisting of sulfhydryl, methionyl, and tryptophanyl groups whereby a colored group sensitive to pH change is added to the enzyme.

References Cited

UNITED STATES PATENTS 3,312,599   4/1967   Koshland et al. _____ 195—68

LIONEL M. SHAPIRO, *Primary Examiner*.